(12) United States Patent
O'Brien et al.

(10) Patent No.: US 9,864,688 B1
(45) Date of Patent: Jan. 9, 2018

(54) DISCARDING CACHED DATA BEFORE CACHE FLUSH

(71) Applicant: EMC IP Holding Company LLC, Hopkinton, MA (US)

(72) Inventors: Walter O'Brien, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 131 days.

(21) Appl. No.: 14/751,699

(22) Filed: Jun. 26, 2015

(51) Int. Cl.
*G06F 12/08* (2016.01)
*G06F 12/0831* (2016.01)

(52) U.S. Cl.
CPC ...... *G06F 12/0833* (2013.01); *G06F 2212/62* (2013.01)

(58) Field of Classification Search
CPC .......................... G06F 12/0833; G06F 2212/62
See application file for complete search history.

(56) References Cited

U.S. PATENT DOCUMENTS

| 8,370,672 B2 * | 2/2013 | Thereska | G06F 1/3221 |
| | | | 713/320 |
| 2005/0071336 A1 * | 3/2005 | Najork | G06F 17/30327 |
| 2007/0162692 A1 * | 7/2007 | Nishimoto | G06F 1/3221 |
| | | | 711/113 |
| 2012/0030408 A1 * | 2/2012 | Flynn | G06F 12/0246 |
| | | | 711/102 |
| 2016/0342351 A1 * | 11/2016 | Li | G06F 11/1471 |

* cited by examiner

*Primary Examiner* — Michael Alsip
(74) *Attorney, Agent, or Firm* — Muirhead and Saturnelli, LLC

(57) ABSTRACT

Described are techniques for processing data. A notification is sent from an application to a cache manager to invalidate any cache location storing data for a first logical address. Responsive to receiving the notification, first processing is performed by the cache manager comprising determining whether data for the first logical address is stored in a cache location; and if it is determined that data for the first logical address is stored in the cache location, designating the cache location as any of free and available for reuse. The foregoing processing for invalidation may also be performed to invalidate a set of cache locations for data from multiple logical addresses.

19 Claims, 8 Drawing Sheets

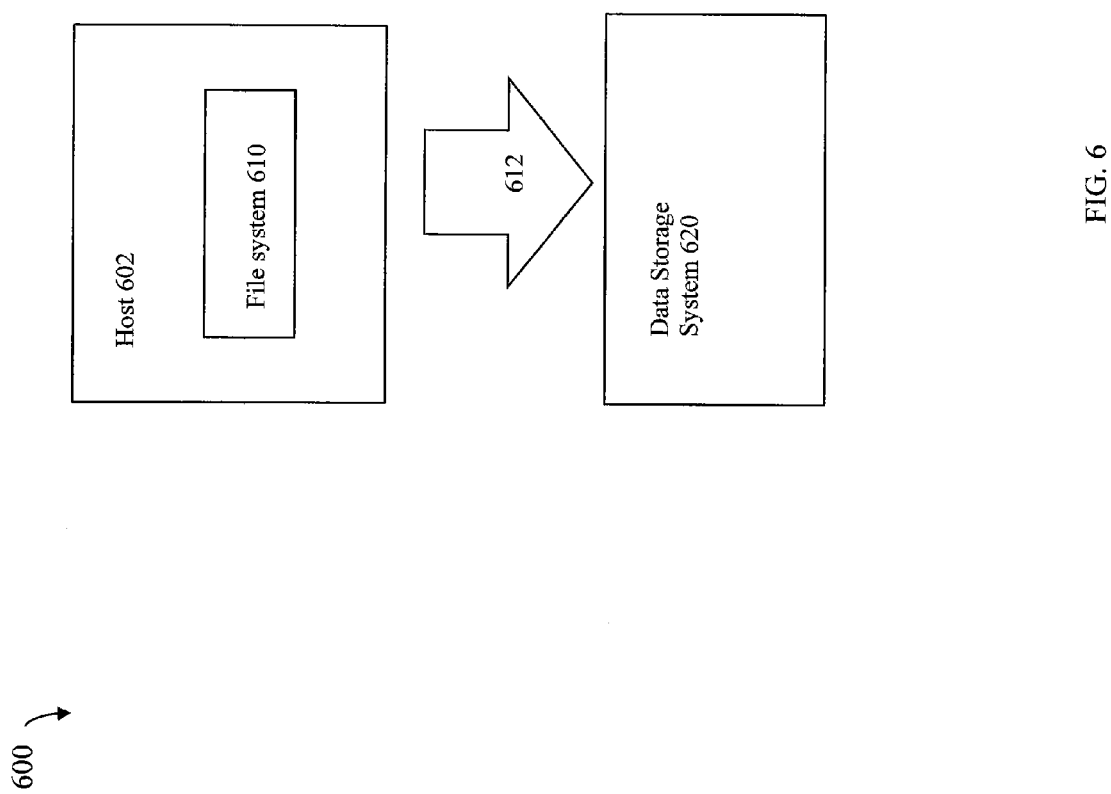

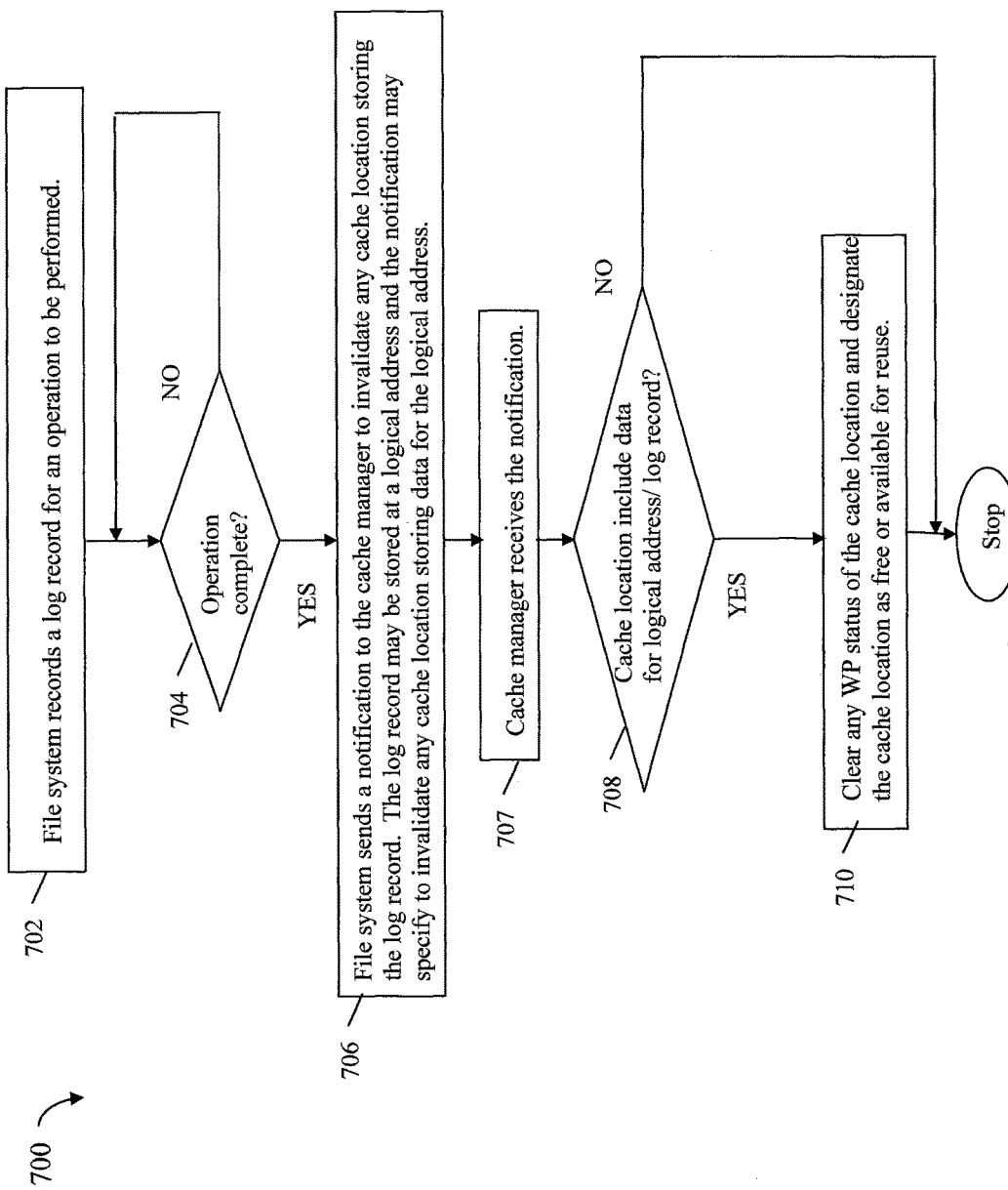

DISCARDING CACHED DATA BEFORE CACHE FLUSH

BACKGROUND

Technical Field

This application generally relates to caching.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method of processing data comprising: sending a notification from an application to a cache manager to invalidate any cache location storing data for a first logical address; and responsive to receiving the notification, performing first processing by the cache manager, said first processing comprising: determining whether data for the first logical address is stored in a cache location; and if it is determined that data for the first logical address is stored in the cache location, designating the cache location as any of free and available for reuse. It may be determined that data for the first logical address is stored in the cache location, and the first processing may further include updating an indicator for the cache location to indicate that the cache location does not include write pending data that is to be written out to physical storage. The application may be any of a file system, a database application, and an application managing objects in an object store. The application, the cache manager and the cache may be included in a single system. The application may be included in a host and sends the notification to a data storage system including the cache and cache manager. The application may use a log file. The first logical address may be a location in the log file at which a first operation is recorded by the application prior to performing the first operation, and wherein, prior to sending the notification, processing for the first operation may have completed. The method may include determining, by the application, that the first data is no longer needed by the application; and responsive to determining that the first data is no longer needed by the application, the application performs said sending to send the notification. The log file may be stored on one or more physical storage devices that are flash-based storage media whereby updating the indicator for the cache location to indicate that the cache location does not include write pending data that is to be written out to the one or more physical storage devices thereby reduces wear of the one or more physical storage devices.

In accordance with another aspect of the invention is a system comprising a cache, and one or more memories comprising: a file system; a cache manager that manages the cache; code that, when executed, performs a method comprising: recording, in a first record of a log file, a first operation to be performed by the file system, said recording occurring prior to the file system commencing processing for the first operation, wherein the first record of the log file has a first logical address; determining that processing for the first operation has completed; responsive to determining that processing for the first operation has completed, sending, from the file system to the cache manager, a notification to invalidate any cache location storing data for the first logical address; responsive to receiving the notification, performing first processing by the cache manager, said first processing comprising: determining whether data for the first logical address is stored in a cache location; and if it is determined that data for the first logical address is stored in the cache location, designating the cache location as any of free and available for reuse. The method may include clearing a write pending status of the cache location including data for the first logical address whereby data of the cache location for the first logical address is not written to physical storage.

In accordance with another aspect of the invention is a computer readable medium comprising code stored thereon that, when executed, performs a method of processing data comprising: sending a notification from an application to a cache manager to invalidate any cache location storing data for a first logical address; and responsive to receiving the notification, performing first processing by the cache manager, said first processing comprising: determining whether data for the first logical address is stored in a cache location; and if it is determined that data for the first logical address is stored in the cache location, designating the cache location as any of free and available for reuse. It may be determined that data for the first logical address is stored in the cache location, and the first processing may further include updating an indicator for the cache location to indicate that the cache location does not include write pending data that is to be written out to physical storage. The application may be any of a file system, a database application, and an application managing objects in an object store. The application, the cache manager and the cache may be included in a single system. The application may be included in a host and may send the notification to a data storage system including the cache and cache manager. The application may use a log file. The first logical address may be a location in the log file at which a first operation is recorded by the application prior to performing the first operation, and wherein, prior to sending the notification, processing for the first operation may have completed. The method may include determining, by the application, that the first data is no longer needed by the application; and responsive to determining that the first data is no longer needed by the application, the application performs said sending to send the notification. The log file may be stored on one or more physical storage devices that are flash-based storage media whereby updating the indicator for the cache location to indicate that the cache location does not include write pending data that is to be written out to the one or more physical storage devices thereby reduces wear of the one or more physical storage devices.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5A, 5B and 6 are examples illustrating processing flow among components in an embodiment in accordance with techniques herein; and FIG. 7 is a flowchart of processing steps that may be performed in an embodiment in accordance with techniques herein.

DETAILED DESCRIPTION OF EMBODIMENT(S)

Figure 1:
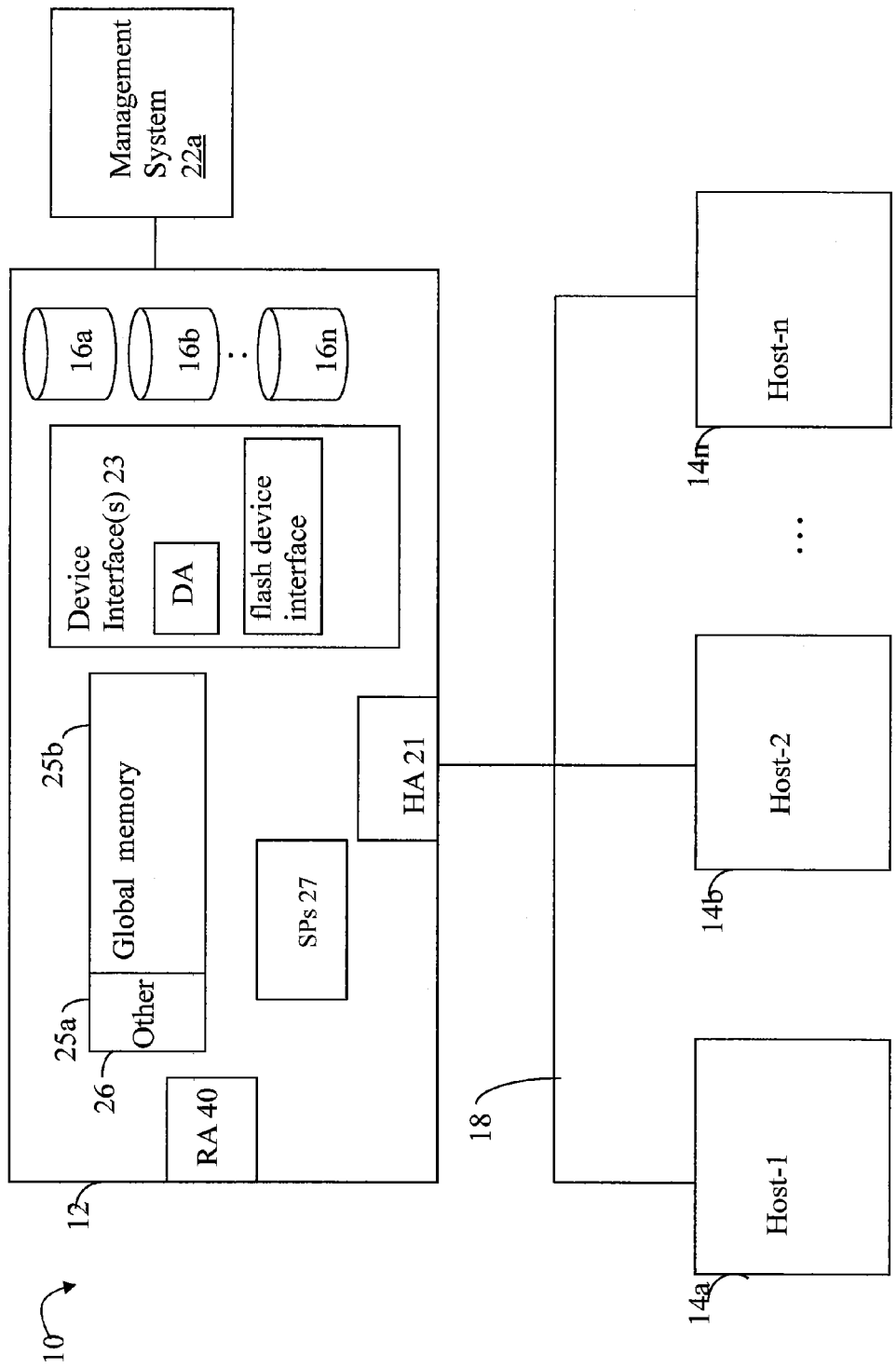
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment. It should also be noted that examples may be provided herein using block-based storage systems. However, as will be appreciated by those skilled in the art, techniques described herein are not so limited and may be readily applied for use with other storage systems and storage techniques such as file systems, object-based systems, databases, and the like.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

As mentioned above, an embodiment may include a cache in the global memory portion 25b. An embodiment may include any one of a variety of different caching data structures and management techniques. An embodiment may use different techniques in connection with data that is read from, or written to, devices in the data storage system. For example, the cache may be used in connection with processing data for read and write operations. In connection with a read operation, the DA may read the data requested from a physical storage device and store it in a cache page included in cache. An example of a cache is described in more detail elsewhere herein. The DA, for example, may obtain a cache page if there is not already one allocated and associated with a particular data track. The data is read from the physical storage device by the DA and stored in the cache page. Indicators associated with the cache page and other structures may be appropriately updated in accordance with the data operation, the state of the data included in the cache page, and the like. Data that is to be written to a device may be first stored in a cache page and the cache page may be appropriately updated (e.g., marked as a write pending by setting appropriate indicators of the cache page and other data structures). The data is then actually written out or destaged to the physical storage device at a later point in time.

In connection with performing I/O operations, such as writes as well as reads, a data storage system in an embodiment in accordance with techniques herein may use a cache in order to improve performance.

Figure 2:
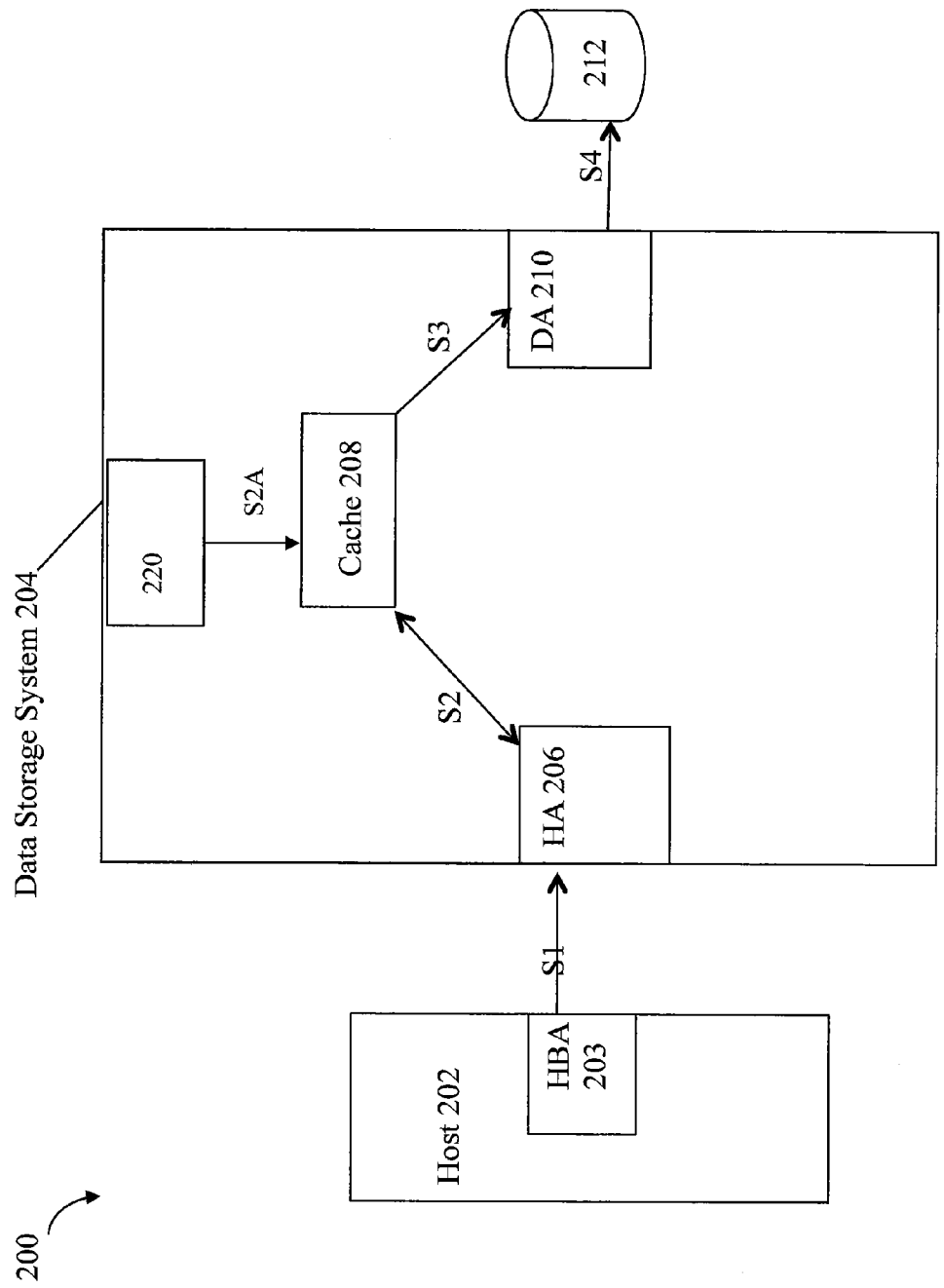
FIG. 2 is an example illustrating processing flow among components in connection with a write operation in an embodiment in accordance with techniques herein.

Referring to FIG. 2, shown is an example illustrating processing of a write I/O operation received at the data storage system in an embodiment in accordance with techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 2 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache page or cache location as write pending (WP) thereby denoting the cache page includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. As also described in more detail elsewhere herein, other processing may be performed in connection with processing the write operation such as, for example, setting the cache page to no longer indicate WP once the write data is written to physical storage in step S4.

In a similar manner with respect to a write operation that originates from a requester, such as a host or application thereon, that is external to the data storage system, an application or other requester 220 that is internal to the data storage system may also originate a write operation whereby, in a step S2A the write operation data is stored in a cache page or cache location of the cache 208 and marked as WP thereby denoting the cache page includes write data that needs to be written to physical storage. Once such write data is stored in cache and marked as WP, processing may be performed at some later time to destage the cached write data in step S3 as described above.

Figure 3:
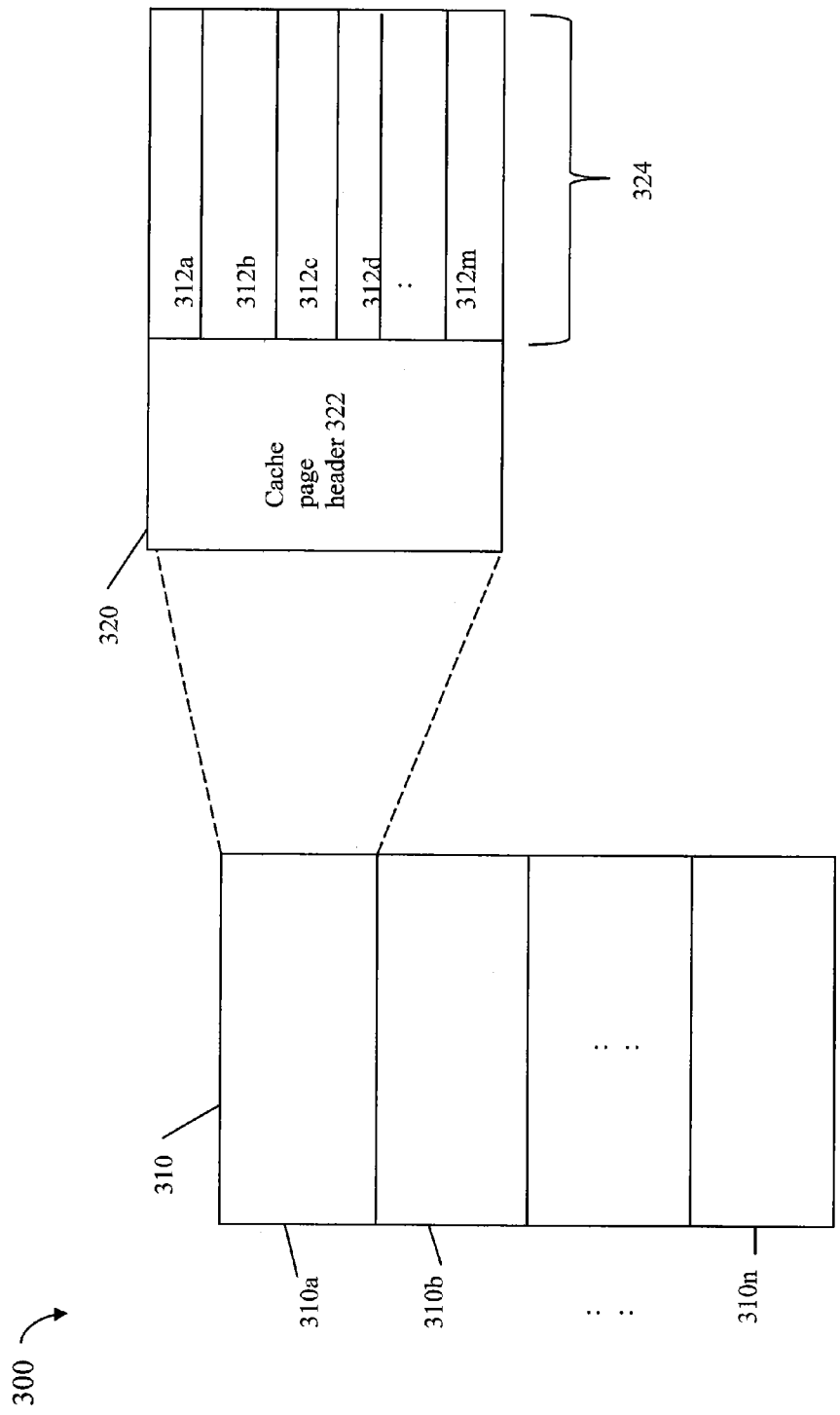
FIG. 3 is an example illustrating a cache that may be used in an embodiment in accordance with techniques herein.

Referring to FIG. 3, shown is an example illustrating a logical representation of a cache that may be used in an embodiment in accordance with techniques herein. In the example 300, element 310 may represent the memory or storage used as the cache which is partitioned into cache pages 310a-310n. It should be noted that the example 300 is a logical representation of a cache that may be implemented using any suitable data structure(s) known in the art. Each of the cache pages 310a-n may contain varying amounts of WP data. Element 320 provides additional detail of single cache page 320. Cache page 320 may include a cache page header 322 and cache page data 324. The cache page data 324 illustrates that a single cache page of data may further include multiple portions 312a-m each of which may or may not include WP data and each of which may or may not include any cached data. The cache page header 322 may include additional information, such as metadata, regarding the cached data stored in 324. For example, the header 322 may denote whether the data cached in each of the portions 312a-m is WP data.

It should be noted that the particular granularity or smallest unit of storage for storing cached data may vary with embodiment. For example, each of the portions 312a-m may denote a smallest unit of storage for storing cached data. Additionally, the particular number of portions in a cache page may also vary with embodiment.

Although not illustrated in FIG. 3 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 310 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

Logging may be performed in connection with many applications. For example, with reference back to FIG. 2, element 220 may denote a file system or database application executing on the data storage system 204 where the file system or database application may perform logging of a transaction or other complex operation. The transaction or complex operation may include performing one or more sub-steps or sub-operations to complete the transaction or complex operation. Logging may be performed, for example, to ensure atomic performance of the transaction or complex operation whereby either all sub-steps or sub-operations are performed, or none of the sub-steps or sub-operations are performed. For example, the transaction or complex operation may be an operation such as to create a file in a file system, perform atomic updates to multiple data structures, and the like. One logging approach is to write a log record recording the particular operation(s) to be performed prior to actually performing the logged operation. Upon the occurrence of a system failure (e.g., power failure) or other event occurrence that may cause the logged operation to fail or not complete, the log can be replayed as part of recovery processing to make sure the logged operation and associated changes were actually completed.

Logging may also allow for faster acknowledgement to be returned to the requester of the logged operation that the logged operation has completed. For example, one embodiment may log a requested operation and return such acknowledgement to the requester even though processing for the requested operation may not have yet completed.

Figure 4:
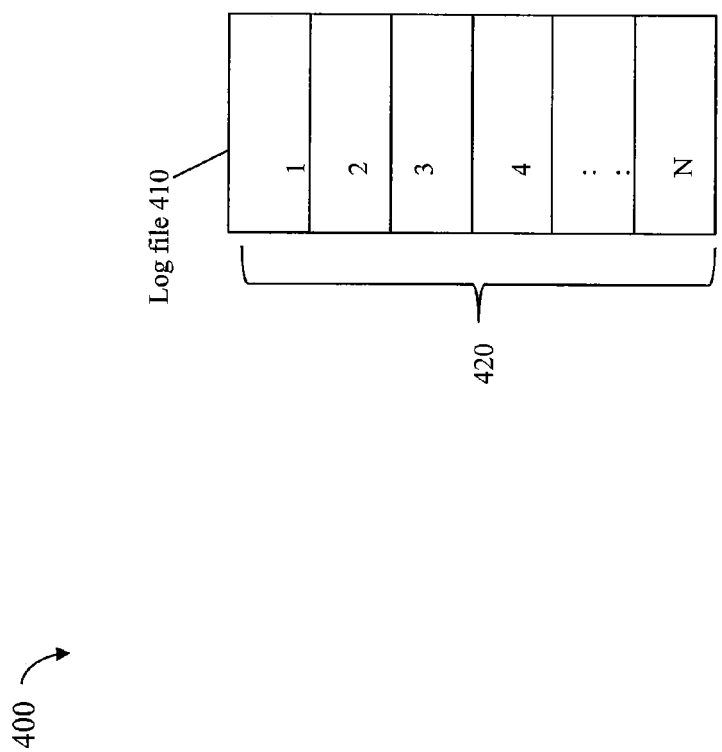
FIG. 4 is an example illustrating a log file that may be used in an embodiment in accordance with techniques herein.

Referring to FIG. 4, shown is an example of a log file that may be used in an embodiment in accordance with techniques herein. In one embodiment in accordance with techniques herein, a file system or other application executing on the data storage system may record logged operations to a log file such as illustrated in FIG. 4. The log file 410 may be stored at a particular location or offset on a LUN having provisioned physical storage on physical storage devices of the data storage system. Thus, each log record may be stored at a logical location represented by a LUN and LBA or offset which is then further mapped to physical storage. In the example 400, the log file 410 includes N records 420. One of the N log records may be used to record logged information for each logged operation. A log record may include, for example, the one or more sub-steps or operations to be performed for the recorded transaction or complex operation. An embodiment may have a log file that may have an upper bound or maximum size N in order to ensure that the log file does not grow indefinitely. Thus, N denotes the maximum number of transactions or operations that may be pending or in-flight at any point in time in this particular embodiment.

As with other files or data written to a LUN, as log records are written to the log file, such write data may be initially written to cache and then later destaged to physical storage storing the log file data. In connection with the file system, or more generally, application or component, that writes to the log file, such application may reuse a log record of the log file 410 once the recorded operation in the log record has been completed. In one embodiment, processing may log operations in records beginning with the first record 1 of the log file 410 and continue sequentially until the end of the log file is reached at record N. Subsequently, processing may continue to log the next $N+1^{th}$ operation by again cycling through the log records 1 through N of the log file and record the $N+1^{th}$ operation in one of the N previously used log records if the recorded operation in the previously used log record has completed. It should be noted that in this particular example, if all N records of the log file are associated with transactions or operations that are still pending and an N+1th operation is received, the N+1th operation is not logged until one of the pending transactions or operations currently logged in one of the N records has completed.

Overwriting a log record (e.g., of a completed operation or transaction) which is associated with a particular cache location may result in writing the new log data (e.g., for another operation or transaction) to the associated cache location and indicating that cache location as including WP data.

The cache, like other data storage system resources, is a finite resource whereby the data storage system may have a limited amount of cache for storing user data such as in connection with servicing read and/or write operations and for other uses. Thus, there may be times when the cache is highly utilized and under heavy contention. For example, a maximum threshold amount of the cache may be consumed leaving little or no available cache for performing subsequent operations. In response to the occurrence of an event such as the foregoing, processing may be performed to increase the amount of cache that is free or available for use. Such processing may include, for example, destaging WP data from cache to physical storage, performing processing to evict data from a cache location that is not WP and reuse such cache location, and the like. It should be noted that the event described above of utilizing a maximum amount of cache is one example of a trigger event or condition that may result in a system performing such processing as also noted above.

At a point in time, transactions or operations having associated log file records currently stored in cache (even though marked as WP) may have completed. Therefore, it may no longer be necessary to store in cache such log file records for completed transactions. Additionally, such log file records for completed transactions also do not need to be destaged or written out to physical storage if such log records are no longer needed.

Described in following paragraphs are techniques that may be performed to notify a cache manager managing the cache that the cached WP data for log records of completed transactions is no longer needed. Thus, cache locations storing log records of completed transactions may be freed or made available for other uses even though the cached log record may be denoted as WP data in the cache. Furthermore, such cache locations storing log records of completed transactions also do not need to be destaged to physical storage prior to reusing such cache locations. In this manner, techniques described in following paragraphs may be used to avoid performing unneeded processing such as to avoid destaging log records of completed transactions to physical storage during time of heavy cache usage or consumption.

In following paragraphs and figures, presented is an example illustration of techniques herein whereby a file system internal to the data storage system may use a log file such as illustrated in FIG. 4 for logging operations. Thus, the file system may be the application or component 220 of FIG. 2. However, as will be appreciated by those skilled in the art and as also noted elsewhere herein, such techniques have broader applicability beyond the particular example provided for illustration purposes. Such techniques herein are more broadly applicable for use with any component or application on the data storage system that performs logging or otherwise performs write operations to a file having its write data stored in cache. More generally, such techniques herein may also be used in connection with an application or component that is also external to the data storage system.

As described in following paragraphs in one particular example, techniques herein provide a mechanism to notify a cache manager managing the cache that one or more particular cache locations include log records for completed transactions and that such cache locations may be designated as free or available for reuse. Furthermore such cache locations do not have to be flushed or destaged to physical storage prior to reuse. Thus, in this particular example, the cache locations storing log records of completed transactions may be freed or made available for reuse by the cache manager without destaging cached data of the cache locations prior to reuse.

Figure 5A:
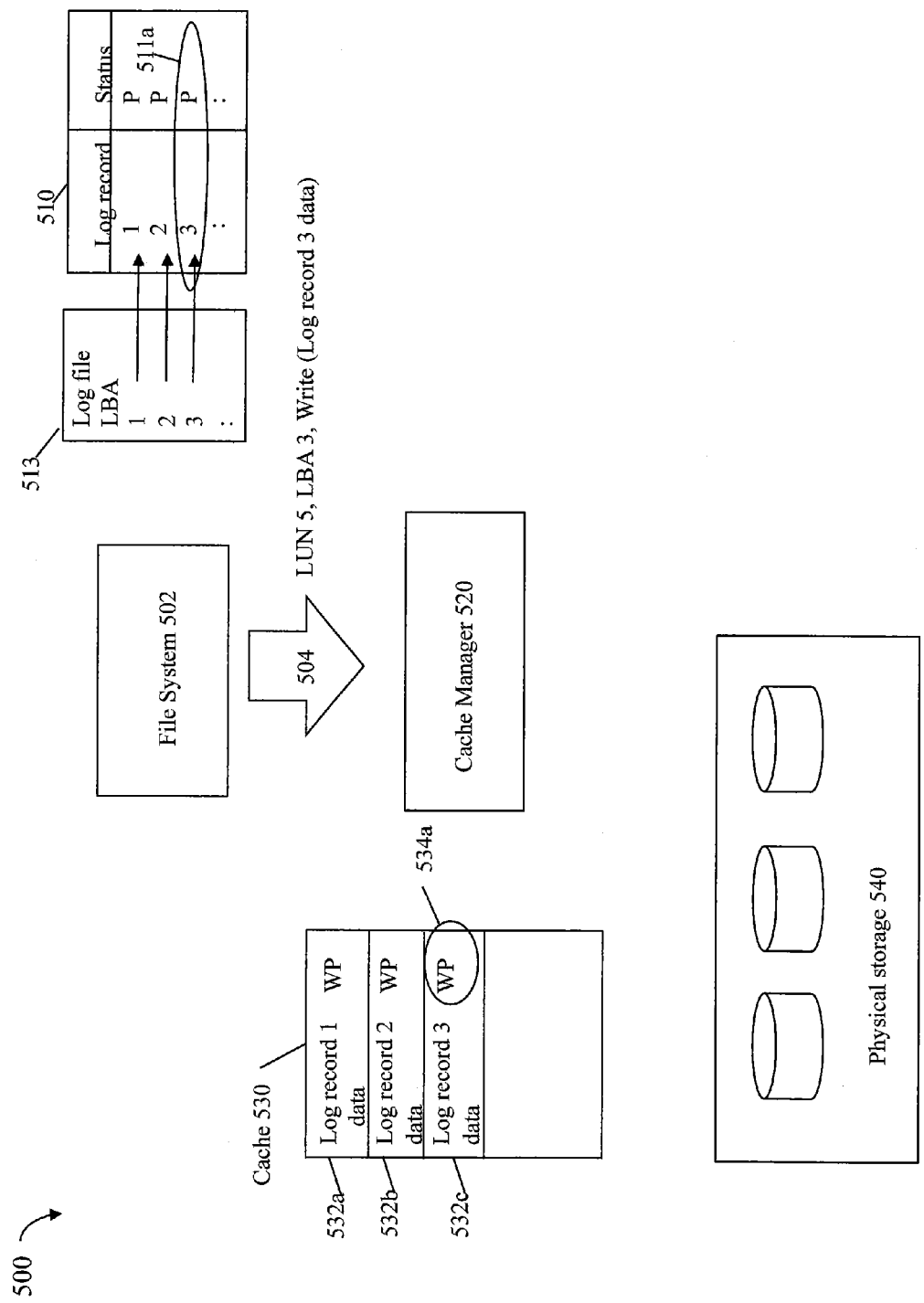

Referring to FIG. 5A, shown is an example 500 of components that may be included in an embodiment of a data storage system in accordance with techniques herein. The example 500 includes a file system 502, cache manager 520, cache 530 and physical storage 540 (denoting multiple PDs providing backend physical storage such as for provisioned LUNs).

The cache manager 520 may represent a component of the data storage system that generally manages the cache 530 and performs various cache management operations. The cache manager 520 may, for example, process requests for cache allocations, perform processing to decide which data remains in cache and which cached data is evicted, such as destaged to physical storage, and the like. Other modules or processes which may utilize the cache resource 530 may communicate with the cache manager 520, for example, for cache allocation requests to obtain a free cache slot.

In connection with this example, the file system 502 may perform logging as described above (e.g., FIG. 4) whereby such log records are written to a log file stored on a LUN. For simplicity of illustration, assume that the log file used by the file system 502 is stored on LUN 5 and each log record may be stored at a different LBA or offset such that log record "i", i being an integer greater than 0, is stored at LBA "i" of LUN 5 (e.g., log record 1 is stored at LUN5, LBA 1; log record 2 is stored at LUN 5, LBA 2, Log record 3 is stored at LUN 5, LBA 3).

Element 510 may denote a table of information maintained by the file system 502 regarding the status of each recorded log operation in log records of the log file. Table 510 may denote, for each log record, a current status of the logged or recorded operation. For example, each row of table 510 may include a log record number denoting a unique log record instance and an associated status for that log record. Each log record in the table 510 may have a status of P denoting that the recorded or logged operation is still pending (e.g., has not yet been completed) or C, denoting that the recorded or logged operation has completed. Log records 1-3 indicate that at a first point in time, the recorded operations logged in recorded 103 are all pending. The three log records 1-3 have been written to the log file whereby data of such log records 1-3 may be respectively stored in cache locations 532a-532c of the cache 530. As illustrated, data of 532a-c may all be WP. For example, element 504 may denote a write to the log filed performed by the file system 502 to write log record 3 to LUN5, LBA 3. In connection with processing the write of log record 3, cache location 532c may be allocated by the cache manager 520 for storing the log record 3 data.

Element 513 denotes the logical address space for the foregoing log file stored on LUN 5 in this example with arrows indicating the association between each log file LBA and entry in table 510 for single log file record.

At some later point in time, data from any of the cache locations 532a-c may be destaged to physical storage 530 provisioned for the log file. Such destaging may occur responsive to a cache management event such as where the cache manager needs to allocate cache for use and there is currently no cache location indicated as free or available for use. As such, destaging data from cache to physical storage is one such cache management operation that the cache manager may perform to increase the amount of free cache available for use.

Techniques herein may be performed in order to avoid unnecessarily performing such destaging for completed operations that have been recorded in the log file by the file system.

Figure 5B:
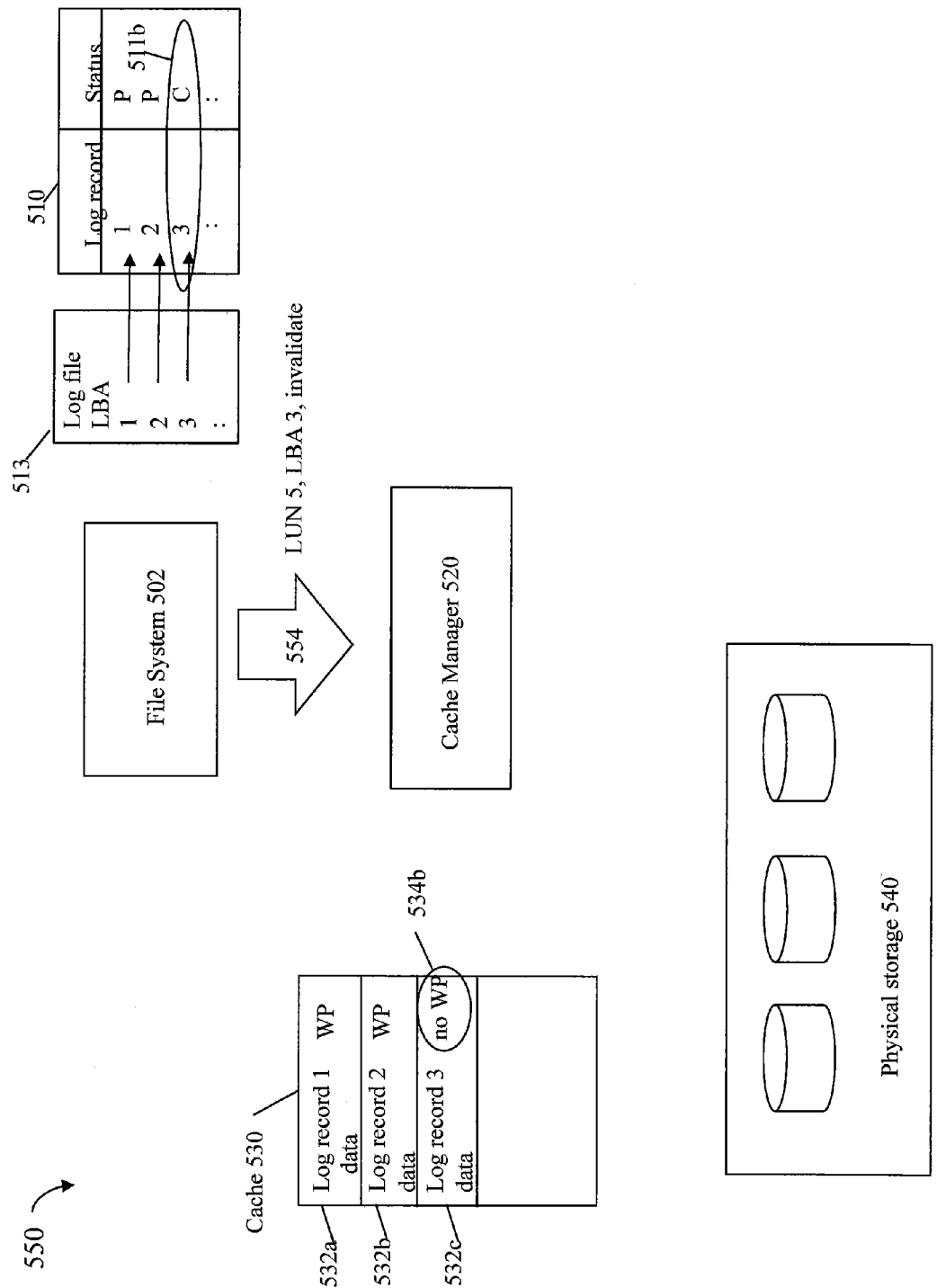

Referring to FIG. 5B, shown is an example 550 illustrating components and status of the data storage system at a second point in time subsequent to the first point in time denoted by FIG. 5A. At this second point in time, the operations recorded in log record 3 as denoted by 511b has completed (e.g., C status of 511b). As such, the file system 502 no longer needs the recorded log record 3 stored at LUN 5, LBA 3. In an embodiment in accordance with techniques herein, the file system 502 may communicate the foregoing to the cache manager 520 that any cache location storing log record 3 data may be designated as free or available for reuse. The cache manager 520 may also clear any WP status for such cache location including log record 3 data so that the log record 3 data is not destaged to physical storage.

Element 554 may represent the notification of invalidation sent from the files system 502 to the cache manager 504 to invalidate any cache location including cached data for LUN 5, LBA 3. Such invalidation may communicate to the cache manager 520 that any cached data for a logical address, such as LUN 5, LBA 3, is no longer needed. Thus, any cache location including cached data for the logical address, such as LUN 5, LBA 3, may be designated as free or available for use. Additionally, such cached data (if any) does not need to be destaged prior to reusing the cache location including the cached data. Thus, the cache manager may clear any associated WP status of the cache location to avoid destaging the cached data of the cache location.

In one aspect, the notification of invalidation 554 sent from the file system 502 to the cache manager 520 may be characterized as an optimization or hint to the cache manager 520 that the associated cache location for the LUN 5, LBA 3 may be designated as free or available for use. The particular processing performed by the cache manager 520 may vary depending on the current state and contents of the cache 530. To further illustrate, consider the following with respect to log record 3 data recorded at LUN 5, LBA 3 of the log file. At the second point in time when the operation recorded in log record 3 completes and the file system 502 issues the notification of invalidation 554, the following are possible statuses or cases with respect to the cache 530:

1. The log record 3 data may be currently stored in cache in a cache location marked as WP;

2. The log record 3 data may have already been destaged or written out to physical storage and may be currently stored in a cache location no longer marked as WP; or 3. The log record 3 data may have already been destaged or written out to physical storage and is currently not stored in cache (e.g., situation of 2. has occurred along with the further step of evicting the data from cache whereby the cache location previously storing the completed transaction log record has also been reused).

In connection with case or status 1), the cache manager may clear the WP status (a denoted by 534*b*) of the cache location 532*c* to indicate that cache location 532*c* no longer includes WP data to be destaged. Additionally, the cache manager may denote that cache location 532*c* as free or available for reuse.

In connection with case or status 2), the cache location 532*c* still includes the log record 3 data but the WP status of cache location 532*c* is already cleared when the notification 554 is received by the cache manager 520. In this case, the cache manager 520 may denote the cache location 532*c* as free or available for reuse and may, for example, include such cache location in a designated pool or list of free or unused cache locations.

In connection with case or status 3, the cache 530 does not include any cached data for LUN 5, LBA 3. As such, there is no responsive action for the cache manager 520 take in response to receiving the notification 554.

Such techniques as illustrated and described in connection with FIGS. 5A and 5B may provide for improved cache utilization in an embodiment of a system having many log files such as for many file systems whereby storing recorded log data for such log files may result in a large amount of cache consumption. Such techniques described herein may be performed to alleviate adverse impact in connection with cache contention by allowing additional cache locations being made available for reuse. Additionally, such techniques provide an additional benefit or reducing the additional destaging I/Os and other processing that may be performed by cache manager to evict cached data. As yet a further advantage, such techniques described herein may also be used reduce device wear out, such as of a flash-based physical storage device, where a log file may be stored on flash-based storage (e.g., avoiding the destaging of cached write data for completed recorded log operations to flash-based storage thereby reduces device wear that would otherwise be incurred due to writing the cached data to the flash-based storage).

As illustrated in FIGS. 5A and 5B and discussed above, such techniques may be used in an embodiment where all components are in a single system, such as a data storage system. As a variation, such techniques described herein may be used in an embodiment where components are in different systems and the notification of invalidation is issued to the data storage system across a network or other connection between systems.

For example, with reference to FIG. 6, shown is another example of an embodiment in accordance with techniques herein. The example 600 includes a host 602, file system 610 and data storage system 620. The components of FIG. 6 are as described above in connection with FIGS. 5A and 5B with the difference that the file system 610 may reside on host 602 rather than the data storage system 620. The data storage system 620 may include the cache, cache manager, physical storage and other components such as described herein and illustrated in FIGS. 5A and 5B. In this case, the file system 610 may issue the notification of invalidation 612 across a network or other connection between the system 602 and 620. For example, the notification of invalidation may be embodied as an API (application programming interface) call, or a command, such as a network or SCSI-based command, issued by the file system 610 to the data storage system 620. The API call or command received from the file system 610 may be provided, for example, as a hint used by the cache manager 620 whereby the cache manager 620 may perform processing to invalidate any cache location, and data thereof, associated with a particular logical address.

Referring to FIG. 7, shown is a flowchart summarizing processing that may be performed in an embodiment in accordance with techniques herein. The flowchart 700 summarizes processing as described above for the particular exemplary use with a file system that logs operations to a log file. Additionally, the steps of 700 are illustrated with respect to a single logged operation that may be repeated for each logged operation.

At step 702, the file system records a log record for an operation to be performed. The logging occurs prior to commencing processing for the operation. At step 704, a determination is made as to whether processing for the operation has completed. Control may remain at step 704 until step 704 evaluates to yes whereby the operation has completed. Upon step 704 evaluating to yes, control proceeds to step 706 where the file system sends a notification to the cache manager to invalidate any cache location storing the log record. The log record may be stored at a logical address (e.g., such as at a LUN, and LBA or offset on the LUN) and the notification may specify to invalidate any cache location storing data for the particular logical address of the log record. At step 707, the cache manager receives the notification. In step 708, the cache manager determines whether there is any cache location including data for the particular logical address of the log record. If step 708 evaluates to no, processing for the notification stops. If step 708 evaluates to yes, control proceeds to step 710. At step 710, processing is performed to clear any WP status of the cache location including data for the particular logical address of the log record. Step 710 may also include designating the cache location as free or available for reuse. After step 710, processing for the notification may stop.

As mentioned, techniques described herein may be used generally with any consumer or user of a log file and is not limited to a file system. Additionally, such techniques may be performed generally in connection with any suitable use and is not limited to performing the invalidation of cache location with respect to log file data. Generally, techniques herein may be used with any consumer to clear the WP status of a cache location including particular cached data (where such cache data may be stored at a specified logical address), and/or provide the cache manager with a hint or notification that any cache location including particular cached data (where such cache data may be stored at a specified logical address) may be designated as free or available for reuse without requiring destaging of the cached data.

It should be noted the foregoing describes processing performed for invalidation with respect to a single cache location including data for a single logical address. More generally, as will be appreciated by those skilled in the art, such processing may be performed to invalidate a set of multiple cache locations for data from multiple logical addresses. In such a case, for example, a single API call may be performed to invalidate the set of multiple cache locations rather than performing a single API call for each individual invalidation of a cache location.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
   recording, by an application, a first operation in a first record of a log file, wherein the first operation recorded in the first record is pending, and wherein the first record of the log file denotes a first logged operation and the first record is located at a first logical address;
   storing the first record of the first logged operation in a cache location associated with the first logical address, wherein said storing includes marking the cache location including the first logged operation as including write pending data to be written out to first non-volatile physical storage provisioned for the first logical address;
   upon completion of the first operation, sending a notification from the application to a cache manager to invalidate any cache location storing data for the first logical address that includes the first record of the log file for the first logged operation; and
   responsive to receiving the notification, performing first processing by the cache manager, said first processing comprising:
     determining whether the cache location includes write pending data for the first logical address; and
     responsive to determining the cache location includes write pending data for the first logical address, designating the cache location, that includes the first record of the first logged operation as write pending data to be written out to the first non-volatile physical storage provisioned for the first logical address, as any of free and available for reuse, wherein said designating is performed prior to destaging the first record of the first logged operation that is write pending data and prevents the first record of the first logged operation that is write pending data from being written to the first non-volatile physical storage.

2. The method of claim 1, wherein said first processing further includes updating an indicator for the cache location to indicate that the cache location does not include write pending data that is to be written out to non-volatile physical storage.

3. The method of claim 1, wherein the application is any of a file system, a database application, and an application managing objects in an object store.

4. The method of claim 1, wherein the application, the cache manager and the cache are included in a single system.

5. The method of claim 1, wherein the application is included in a host and sends the notification to a data storage system including the cache and cache manager.

6. The method of claim 1, wherein the first operation is recorded in the first record of the log file by the application prior to performing the first operation.

7. The method of claim 1, wherein upon completion of the first operation, the first record of the log file recording the first operation is no longer needed by the application.

8. The method of claim 1, wherein the log file is stored on a logical device having storage provisioned from one or more physical storage devices that are flash-based storage media whereby performing said designating prior to destaging the write pending data prevents the write pending data from being written to the first non-volatile physical storage thereby reduces wear of the one or more physical storage devices that would otherwise be incurred due to writing the write pending data from the cache location to the flash-based storage media.

9. A system comprising:
   a cache; and
   one or more memories comprising:
     a file system;
     a cache manager that manages the cache; and
     code that, when executed, performs a method comprising:
       recording, in a first record of a log file, a first operation to be performed by the file system, said recording occurring prior to the file system commencing processing for the first operation, wherein the first record of the log file denoted a first logged operation and the first record is located at a first logical address;
       storing the first record of the logged operation in a cache location associated with the first logical address, wherein said storing includes marking the cache location including the first logged operation as including write pending data to be written out to first non-volatile physical storage provisioned for the first logical address;
       determining that processing for the first operation has completed;
       responsive to determining that processing for the first operation has completed, sending, from the file system to the cache manager, a notification to invalidate any cache location storing data for the first logical address that includes the first record of the log file for the first logged operation; and
       responsive to receiving the notification, performing first processing by the cache manager, said first processing comprising:
         determining whether the cache location includes write pending data for the first logical address; and
         responsive to determining the cache location includes write pending data for the first logical address, designating the cache location, that includes the first record of the first logged operation as write pending data to be written out to the first non-volatile physical storage provisioned for the first logical address, as any of free and available for reuse, wherein said designating is performed prior to destaging the first record of the first logged operation that is write pending data and prevents the first record of the first logged operation that is write pending data from being written to the first physical storage.

10. The system of claim 9, wherein the first processing further includes:
    clearing a write pending status of the cache location including data for the first logical address.

11. A non-transitory computer readable medium comprising code stored thereon that, when executed, performs a method of processing data comprising:
    recording, by an application, a first operation in a first record of a log file, wherein the first operation recorded in the first record is pending, and wherein the first record of the log file denotes a first logged operation and the first record is located at a first logical address;
    storing the first record of the first logged operation in a cache location associated with the first logical address, wherein said storing includes marking the cache location including the first logged operation as including write pending data to be written out to first non-volatile physical storage provisioned for the first logical address;
    upon completion of the first operation, sending a notification from the application to a cache manager to invalidate any cache location storing data for the first logical address that includes the first record of the log file for the first logged operation; and
    responsive to receiving the notification, performing first processing by the cache manager, said first processing comprising:
        determining whether the cache location includes write pending data for the first logical address; and
        responsive to determining the cache location includes write pending data for the first logical address, designating the cache location, that includes the first record of the first logged operation as write pending data to be written out to the first non-volatile physical storage provisioned for the first logical address, as any of free and available for reuse, wherein said designating is performed prior to destaging the first record of the first logged operation that is write pending data and prevents the first record of the first logged operation that is write pending data from being written to the first non-volatile physical storage.

12. The non-transitory computer readable medium of claim 11, wherein said first processing further includes updating an indicator for the cache location to indicate that the cache location does not include write pending data that is to be written out to non-volatile physical storage.

13. The non-transitory computer readable medium of claim 11, wherein the application is any of a file system, a database application, and an application managing objects in an object store.

14. The non-transitory computer readable medium of claim 11, wherein the application, the cache manager and the cache are included in a single system.

15. The non-transitory computer readable medium of claim 11, wherein the application is included in a host and sends the notification to a data storage system including the cache and cache manager.

16. The non-transitory computer readable medium of claim 11, wherein the first operation is recorded in the first record of the log file by the application prior to performing the first operation.

17. The non-transitory computer readable medium of claim 11, wherein upon completion of the first operation, the first record of the log file recording the first operation is no longer needed by the application.

18. The non-transitory computer readable medium of claim 11, wherein the log file is stored on a logical device having storage provisioned from one or more physical storage devices that are flash-based storage media whereby performing said designating prior to destaging the write pending data prevents the write pending data from being written to the first non-volatile physical storage thereby reduces wear of the one or more physical storage devices that would otherwise be incurred due to writing the write pending data from the cache location to the flash-based storage media.

19. The method of claim 1, further comprising:
    determining whether the cache location includes data for the first logical address that is not write pending; and
    responsive to determining the cache location include data for the first logical address that is not write pending, designating the cache location as any of free and available for reuse.

* * * * *